US012465039B1

(12) United States Patent
Lei et al.

(10) Patent No.: US 12,465,039 B1
(45) Date of Patent: Nov. 11, 2025

(54) INSECT TRAPPING DEVICE

(71) Applicant: Shenzhen Guanke Technologies Co., Ltd, Shenzhen (CN)

(72) Inventors: Bo Lei, Shenzhen (CN); Qing Lan, Shenzhen (CN); Yu Lei, Shenzhen (CN); Haiying Wu, Shenzhen (CN)

(73) Assignee: SHENZHEN GUANKE TECHNOLOGIES CO., LTD, Shenzhen (CN)

( * ) Notice: Subject to any disclaimer, the term of this patent is extended or adjusted under 35 U.S.C. 154(b) by 0 days.

(21) Appl. No.: 18/966,209

(22) Filed: Dec. 3, 2024

(30) Foreign Application Priority Data

Sep. 25, 2024 (CN) .......................... 202411346973.0

(51) Int. Cl.
*A01M 1/14* (2006.01)
(52) U.S. Cl.
CPC .................................. *A01M 1/145* (2013.01)
(58) Field of Classification Search
CPC .................................................... A01M 1/145
See application file for complete search history.

(56) References Cited

U.S. PATENT DOCUMENTS

| 5,111,610 A | * | 5/1992 | Morisset | A01M 1/2055 |
| | | | | 43/132.1 |
| RE34,402 E | * | 10/1993 | Williams | A01M 1/145 |
| | | | | 43/115 |
| 12,396,449 B1 | * | 8/2025 | Lingren | A01M 1/026 |
| 2017/0303523 A1 | * | 10/2017 | Sandford | A01M 1/023 |
| 2022/0295775 A1 | * | 9/2022 | Furner | A01M 1/14 |

FOREIGN PATENT DOCUMENTS

| DE | 3511215 C2 * | 3/1990 | ............ A01M 1/16 |
| KR | 200457870 Y1 * | 1/2012 | ............ A01M 1/145 |

* cited by examiner

*Primary Examiner* — Richard G Davis
(74) *Attorney, Agent, or Firm* — Maier & Maier, PLLC

(57) ABSTRACT

An insect trapping device, which includes an insect trapping lamp and a killing structure. The insect trapping lamp includes a lamp body, a control switch, and at least two light sources. The control switch and the light sources are provided at the lamp body. The at least two light sources includes a first light source and a second light source. The first light source and the second light source emit light of different colors, and the control switch controls the first light source and the second light source to be turned on. The killing structure is detachably connected to the lamp body and is at least partially provided at an illumination area of the insect trapping lamp. A color of the killing structure corresponds to a color of light emitted by the first light source or the second light source.

10 Claims, 13 Drawing Sheets

US 12,465,039 B1

INSECT TRAPPING DEVICE

CROSS-REFERENCE TO RELATED APPLICATIONS

This application claims priority to Chinese Patent Application No. 202411346973.0, filed on Sep. 25, 2024, the entire disclosure of which is incorporated herein by reference.

TECHNICAL FIELD

The present application relates to the technical field of lamps, and in particular to an insect trapping device.

BACKGROUND

The insect trapping device generally includes an insect trapping lamp and a killing structure. The insect trapping lamp emits light to lure insects to the killing structure, so as to capture and kill the insects. However, there are limited insect-trapping effects in the insect trapping device in the related art.

SUMMARY

The main purpose of the present application is to provide an insect trapping device, aiming to improve the insect-trapping effects of the insect trapping device To achieve the above purpose, the present application provides an insect trapping device including:

an insect trapping lamp including a lamp body, a control switch, and at least two light sources, the control switch and the light sources being provided at the lamp body, the at least two light sources including a first light source and a second light source, the first light source and the second light source being configured to emit light of different colors, and the control switch being configured to control the first light source and the second light source to be turned on; and a killing structure detachably connected to the lamp body, the killing structure being at least partially provided at an illumination area of the insect trapping lamp, to enable the killing structure to be illuminated by the insect trapping lamp and emit light, and a color of the killing structure corresponding to a color of light emitted by the first light source or the second light source.

Other features and corresponding beneficial effects of the present application are described in the later part of this specification.

The technical solutions to solve the technical problem and related product design schemes of the present application will be described in the following. The light source of the insect trapping lamp is configured to include a first light source and a second light source that can emit light of different colors, and the first light source and the second light source are selectively controlled to be turned on by a control switch. In addition, a killing structure having a color corresponding to the color of the light emitted by the first light source and the second light source is provided. In this way, when facing different insect trapping needs in different use environments, the first light source or the second light source can be controlled to be turned on according to the needs, and the killing structure with the same color of light emitted by the light source can be used in combination to enhance the luminous intensity of the killing structure. In this case, the insect trapping device can form an insect trapping light effect that meets the needs and intensity in different environments, which is conducive to improving the insect trapping effect of the insect trapping device.

Figure 1:
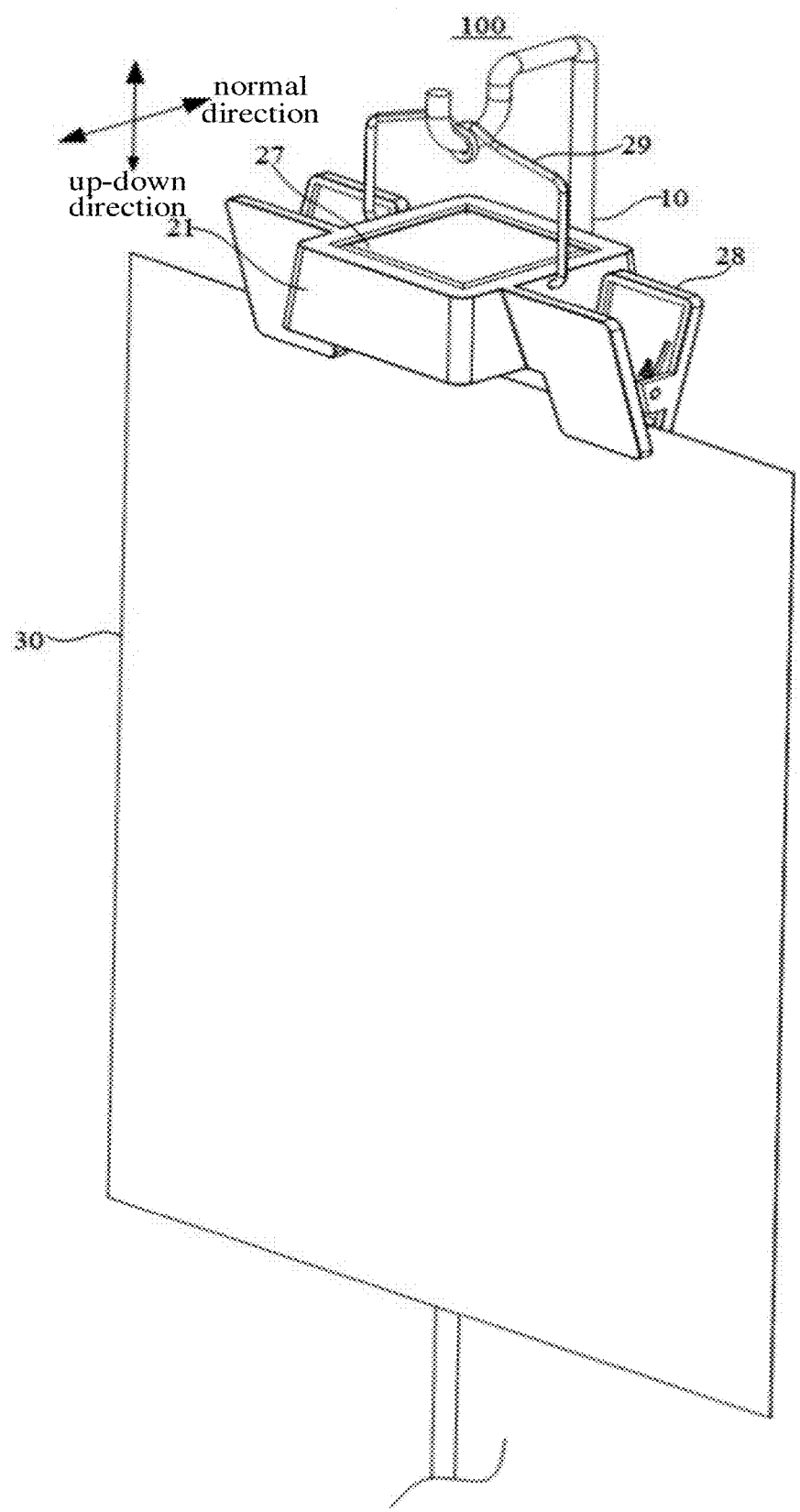
FIG. 1 is a schematic structural diagram of an insect trapping device according to an embodiment of the present application.

The shapes, sizes, proportions or positional relationships of the product parts shown in the drawings may be actual data of the embodiments, which shall fall within the scope of the present application.

DETAILED DESCRIPTION OF THE EMBODIMENTS

In order to make the purpose, technical solutions and advantages of the present application more clear, embodiments of the present application will be further described in detail below through specific implementation methods with reference to the accompanying drawings. It should be understood that the specific embodiments described here are only used to explain the present application, and are not used to limit the present application.

As shown in FIG. 1 to FIG. 9, the present application provides an insect trapping device 100. In an embodiment of the present application, the insect trapping device 100 may include a support frame 10, an insect trapping lamp 20, and a killing structure 30. The insect trapping lamp 20 includes a lamp body 21, a control switch 22, and at least two light sources 23. The lamp body 21 is provided at the support frame 10. The control switch 22 and the light source 23 are provided at the lamp body 21. The at least two light sources 23 include a first light source 231 and a second light source 232. The first light source 231 and the second light source 232 may emit light of different colors. The control switch 22 is configured to control the first light source 231 and the second light source 232 to be selectively turned on. The killing structure 30 is detachably connected to the lamp body 21 and is at least partially provided in the illumination area of the insect trapping lamp 20, so that the killing structure 30 can be illuminated by the insect trapping lamp 20. The color of the killing structure 30 corresponds to the color of the light emitted by the first light source 231 or the second light source 232.

The support frame 10 can be fixed to the ground or other objects, and can be used to install and bear the insect trapping lamp 20. The support frame 10 can be a single rod structure, which can be in a linear shape, or a curved shape, or a combination of the linear shape and the curved shape. The support frame 10 can further be a combination of at least two rods, or a plate structure. It can be seen that, the structural type and the shape of the support frame 10 are not limited in the present application, as long as the support frame 10 can be used to install and bear the insect trapping lamp 20. In addition, the support frame 10 is fixed to the ground or other objects, which means that the support frame 10 can be directly inserted into the ground or other objects, or the support frame 10 can be connected and fixed by screws. The installation method of the support frame 10 on the ground or other objects is not limited in the present application. In addition, it should be noted that in some embodiments, the insect trapping device 100 may not include the support frame 10. In this case, the insect trapping lamp 20 can be directly installed at a building, such as a rod in the environment where the insect trapping lamp 20 is located.

The insect trapping lamp 20 can be configured as a carrier of the control switch 22, the light source 23 and other components of the insect trapping lamp 20 through the lamp body 21, so that the various components of the insect trapping lamp 20 can be assembled into a whole structure. The lamp body 21 can be shaped in any structure, such as a cube, a cuboid, or a cylinder. The control switch 22 and the light source 23 can be provided at the inner side of the lamp body 21, or at the outer side of the lamp body 21. In addition, the connection between the lamp body 21 and the support frame 10 can be a fixed connection, or any detachable connection such as a hanging connection, a magnetic connection, or a clamping connection. Furthermore, the insect trapping lamp 20 can control the working state of the light source 23 through the control switch 22. In order to simplify the number of parts, one control switch 22 can be provided. In this case, the control switch 22 can be a sliding switch or a rotating switch, and has a first on position, a second on position, and an off position. When the control switch 22 is in the first on position, the first light source 231 can be turned on. When the control switch 22 is in the second on position, the second light source 232 can be turned on. When the control switch 22 is in the off position, both the first light source 231 and the second light source 232 can be turned off. In this way, by driving the control switch 22 to move to the corresponding position, the light source 23 can be controlled to be selectively turned on. In some embodiments, at least two control switches 22 can be provided, so that one control switch 22 can be used to control one light source 23 to be turned on and off. In this case, each control switch 22 can have two positions to correspond to the turning on and off states of the light source 23. In addition, in order to facilitate the electrical connection between the control switch 22 and the at least two light sources 23, the insect trapping lamp 20 may further include a lamp panel 25. The at least two light sources 23 may be installed at the lamp panel 25, and the control switch 22 is electrically connected to the lamp panel 25. Further, the insect trapping lamp 20 may emit light capable of attracting insects through the light source 23. At least two light sources 23 can be provided, including a first light source 231 and a second light source 232, so that the insect trapping lamp 20 can emit light of two colors. At least three light sources 23 can also be provided. In this case, at least two first light sources 231 can be provided, and/or at least two second light sources 232 can be provided. Or, the light sources 23 may further include other light sources 23 capable of emitting light of a color different from the color of the light emitted by the first light source 231 and the second light source 232. It can be seen that the number of light sources 23 is not limited in the present application, as long as it can emit light of at least two colors. The color of the light emitted by the first light source 231 can be purple as described below, and the color of the light emitted by the second light source 232 can be yellow as described below, so that the insect trapping lamp 20 can emit purple or yellow light. In some embodiments, the color of the light emitted by the first light source 231 and the second light source 232 can also be other color, such as red or green. It can be seen that the color of the light emitted by the first light source 231 and the second light source 232 is not limited in the present application. In addition, the light source 23 can be a light-emitting diode (LED) lamp bead, so that the volume is relatively small and easy to install. In other embodiments, the light source 23 can also be a fluorescent lamp, and the type of the light source 23 is not limited in the present application.

The killing structure 30 can be provided adjacent to the insect trapping lamp 20, so that at least a part of the killing structure 30 can be illuminated by the insect trapping lamp 20. In this case, the killing structure 30 can be illuminated and emit light. Then when the insects are attracted by the light emitted by the insect trapping lamp 20 and the killing structure 30 and are trapped to the killing structure 30, the killing structure 30 can capture and kill the insects by adhesion, or by electric shock. It can be seen that, the structural type of the killing structure 30 is not limited in the present application. The color of the killing structure 30 can be adaptively set corresponding to the color of the light emitted by the light source 23, and then in subsequent usage, according to the color type of the light emitted by the light source 23, the killing structure 30 with the same color as the light emitted by the light source 23 can be selectively installed. In this case, it is convenient for the light emitted by the light source 23 to be transmitted to the killing structure 30, thereby improving the reflection and diffusion effect of the light, improving the illumination effect of the killing structure 30 and improving the insect-trapping effect. In addition, the killing structure 30 can be a plate structure as described below, and in some embodiments it can also be a cylindrical structure, and the like. The shape of the killing structure 30 is not limited in the present application. In addition, the killing structure 30 is connected to the lamp body 21 of the insect trapping lamp 20, so that the killing structure 30 is close to the insect trapping lamp 20, which may further improve the illumination effect of the insect trapping lamp 20 on the killing structure 30. In some embodiments, the killing structure 30 can also be connected to the support frame 10.

In an embodiment of the present application, the light source 23 can emit purple light, and the purple killing structure 30 can be used together to conduct a related first experiment for comparing the control effect when the insect trapping lamp 20 capable of emitting purple light is used in combination with the purple killing structure 30 for the strawberry *thrips* and the control effect when the purple killing structure 30 is used alone for the strawberry *thrips*.

In the first experiment, the experimental materials include the insect trapping lamp 20 capable of emitting purple light, the purple killing structure 30, strawberry plants and plant lamps, and four groups of comparative tests are set, namely the first comparative test, the second comparative test, the third comparative test and the fourth comparative test. Moreover, each group of comparative tests includes the first embodiment and the second embodiment. In the first embodiment, the insect trapping lamp 20 is used in combination with the purple killing structure 30, and in the second embodiment, the killing structure 30 is used. In each comparison test, a purple killing structure 30 with a size of 20*25 cm is used, and the insect trapping lamp 20 can be suspended over the killing structure 30. Besides, the lighting cycle of the plant light can be 10 h/d (20:00-06:00), and the use cycle of the insect trapping lamp 20 is 3 h/d (14:00-17:00).

Figure 12:
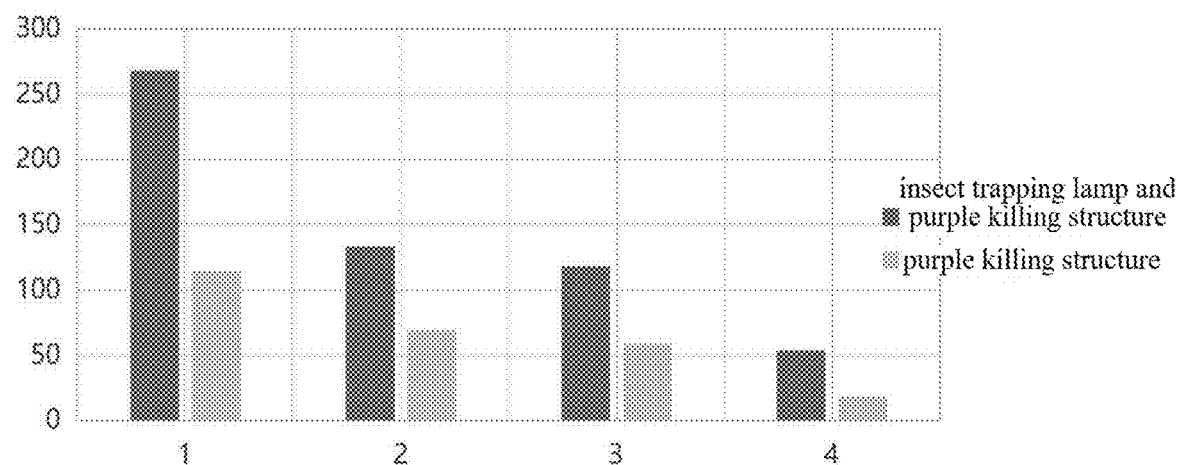
FIG. 12 is a schematic diagram of test results of a first experiment.

Further, the experimental results are as follows. In the first comparative test, the specific trapping test results are shown in FIG. 12. It can be seen that the number of insects stuck in the killing structure 30 in the first embodiment is significantly higher than the number of insects stuck in the killing structure 30 in the second embodiment. In the second comparative test, another purple killing structure 30 is replaced, and the others remain unchanged. The specific trapping test results are shown in FIG. 12. In the third comparative test, another purple killing structure 30 is replaced, and the others remain unchanged. The specific trapping test results are shown in FIG. 12. In the fourth comparative test, another purple killing structure 30 is replaced again, and the others remain unchanged. The specific trapping test results are shown in FIG. 12.

Figure 13:
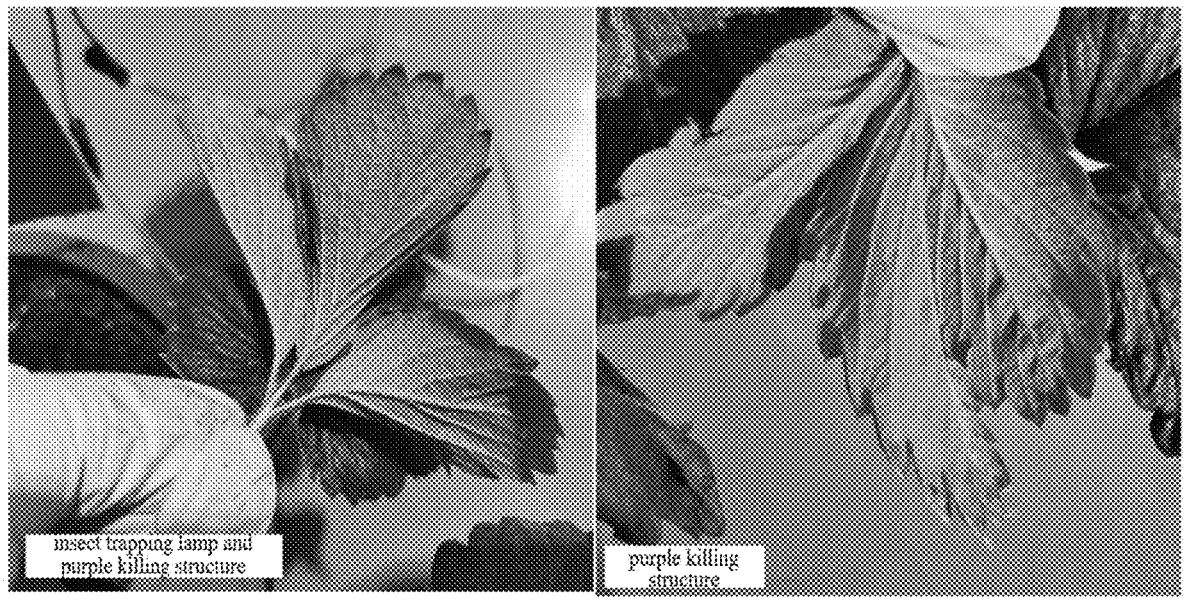
FIG. 13 is a physical image of the tested plants in the first experiment.

As shown in FIG. 12, the above experimental comparison and test results show that when the insect trapping lamp 20 capable of emitting purple light is used in combination with the purple killing structure 3, the trapping effect on strawberry *thrips* is better. The actual comparison between the strawberry plants in the first embodiment and the strawberry plants in the second embodiment is shown in FIG. 13. It can also be seen that there are no thrip damage symptoms on the new leaves of the plants in the first embodiment, and no thrip activity is observed, while the number of pests on the old leaves is also reduced. In contrast, the new leaves of the plants in the second embodiment have thrip damage symptoms and thrip activity.

In an embodiment of the present application, the light source 23 capable of emitting purple light is still used, and the purple killing structure 30 or the yellow killing structure 30 is used in combination to conduct the related second experiment, so as to compare the trapping effects when the insect trapping lamp 20 is used in combination with the yellow killing structure 30, the trapping effects when the insect trapping lamp 20 is used in combination with the purple killing structure 30, the trapping effects when the yellow killing structure 30 is used alone, and the trapping effects when the purple killing structure 30 is used alone on the strawberry gray planthopper.

In the second experiment, the experimental materials include the insect trapping lamp 20, the yellow killing structure 30, and the purple killing structure 30. Six groups of comparative tests are set, namely the first comparative test, the second comparative test, the third comparative test, the fourth comparative test, the fifth comparative test, and the sixth comparative test. Moreover, each group of comparative tests includes the first embodiment, the second embodiment, the third embodiment and the fourth embodiment. In the first embodiment, an insect trapping lamp 20 is used in combination with a purple killing structure 30. In the second embodiment, a purple killing structure 30 is used. In the third embodiment, an insect trapping lamp 20 is used in combination with a yellow killing structure 30. In the fourth embodiment, a yellow killing structure 30 is used. Each group of comparative tests can use a killing structure 30 in the same size. The insect trapping lamp 20 can be suspended above the killing structure 30. The illumination cycle of the plant light can be 10 h/d (20:00-06:00), and the use cycle of the insect trapping lamp 20 is 3 h/d (14:00-17:00).

Figure 14:
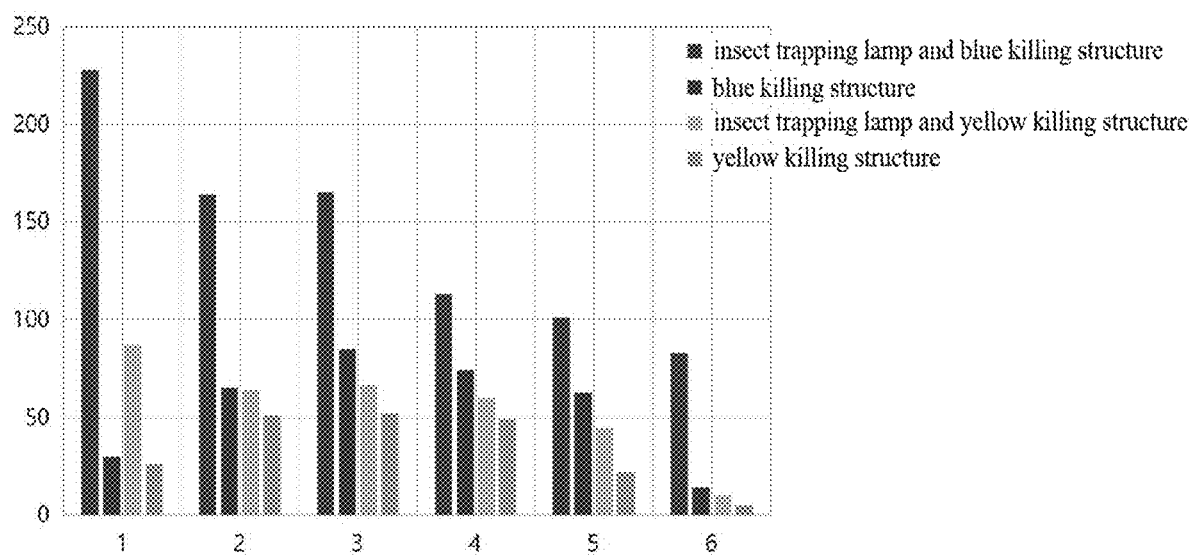
FIG. 14 is a schematic diagram of the test results of a second experiment.

Further, the experimental results are as follows. In the first comparative test, the specific trapping test results are shown in FIG. 14. It can be seen that, the first embodiment has the best effect about adhering gray planthoppers, and the third embodiment has the second best effect about adhering gray planthoppers. In the second comparative test, the specific trapping test results are shown in FIG. 14, and it can be seen that, the first embodiment has the best effect about adhering gray planthoppers. In the third comparative test, the specific trapping test results are shown in FIG. 14, and it can be seen that, the first embodiment has the best effect about adhering gray planthoppers. After this round, density of the gray planthoppers in the environment are decreased significantly. In the fourth comparative test, the specific trapping test results are shown in FIG. 14, and it can be seen that after the fourth round of experiments, the first embodiment has the best effect about adhering gray planthoppers. In the fifth comparative test, the specific trapping test results are shown in FIG. 14, and it can be seen that after the fifth round of experiments, the first embodiment has the best effect about adhering gray planthoppers. In the sixth comparative test, after the prior five rounds of experiments, the gray planthopper density in this stage is relatively small, and the specific trapping test results are shown in FIG. 14. It can be seen that the first embodiment has the best effect about adhering gray planthoppers.

From the above experimental comparison and the test results shown in FIG. 14, it can be seen that when the insect trapping lamp 20 is used in combination with the purple killing structure 30, the effect about adhering gray planthoppers of the light-trapped method is better. In addition, when the insect trapping lamp 20 is used in combination with the yellow killing structure 30, the effect about adhering gray planthoppers of the light-trapped method is also better.

Therefore, in order to improve the trapping effect of the insect trapping device 100, in an embodiment of the present application, the first light source 231 can be configured to emit purple light, and the color of the selected killing structure 30 can be purple. Further, the crest of the light emitted by the first light source 231 can be ranged form 395 nm to 405 nm. In this case, the test in the first experiment shows that the trapping effect is better.

In another embodiment of the present application, the second light source 232 can be configured to emit yellow light, and the color of the selected killing structure 30 can be yellow. Further, when the second light source 232 is configured to emit yellow light, the crest of the light emitted by the second light source 232 can be ranged form 585 nm to 595 nm.

As shown in FIG. 4 to FIG. 9, in an embodiment of the present application, the lamp body 21 can be provided with an installation space 210. The control switch 22 and the light source 23 are both provided in the installation space 210, and a part of the control switch 22 passes through the lamp body 21 and extends to the outside. The lamp body 21 is provided with a light-transmitting portion 219*b* at a position corresponding to the light source 23.

In this embodiment, the control switch 22 and the light source 23 are provided in the installation space 210 of the lamp body 21, which can improve the isolation and protection effect thereof. In addition, the aesthetic appearance of the insect trapping lamp 20 can be improved. The light-transmitting portion 219*b* can be an open hole structure, and it can also be a light-transmitting plate or a light-transmitting block structure. In addition, the lamp panel 25 as mentioned above can also be provided in the installation space 210.

As shown in FIG. 4 and FIG. 7 to FIG. 9, in an embodiment of the present application, the lamp body 21 may include a housing 212 and a reflector 219. One end of the housing 212 may be configured as an opening. The reflector 219 covers the opening of the housing 212 and forms an installation space 210 together with the housing 212. A part of the control switch 22 passes through the housing 212 and extends to the outside. The reflector 219 is provided with a light-transmitting portion 219*b* at a position corresponding to the light source 23. In the direction where the insect trapping lamp 20 faces the killing structure 30, the reflector 219 is flared.

In this embodiment, the lamp body 21 includes the housing 212 and the reflector 219, so that the housing 212 and the reflector 219 can be manufactured separately, and then they can be assembled into a whole structure, which is conducive to improving the convenience of processing and forming the installation space 210. Moreover, in the direction where the insect trapping lamp 20 approaches the killing structure 30, the reflector 219 is in a flared shape, so that the reflector 219 can have a better reflection effect on the light. In this way, the illumination rate of the light emitted by the insect trapping lamp 20 on the killing structure 30 can be improved, thereby improving the illumination effect of the insect trapping lamp 20 on the killing structure 30.

Figure 8:
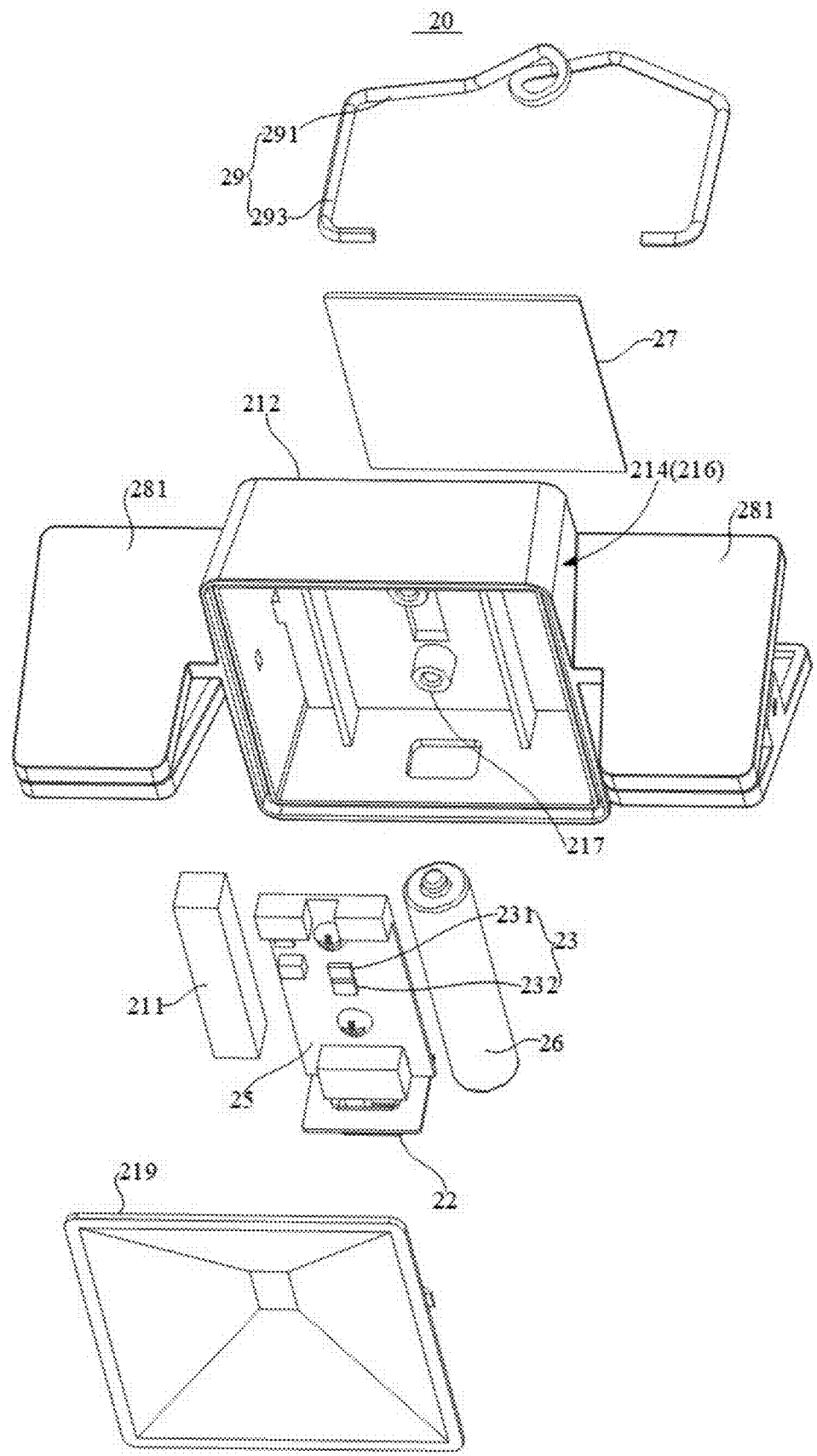
FIG. 8 is an exploded schematic structural diagram of the insect trapping lamp in FIG. 7 from another perspective.
Figure 9:
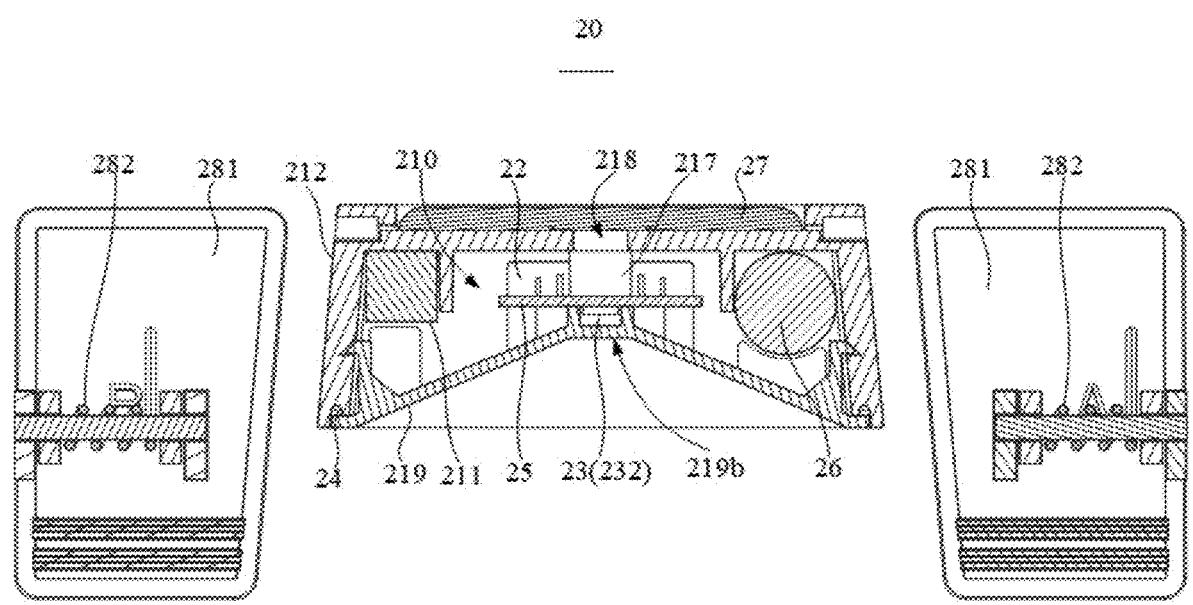
FIG. 9 is a schematic cross-section diagram of the insect trapping lamp in FIG. 4.

In an embodiment of the present application, in order to simplify the installation of the lamp panel 25 as mentioned above in the installation space 210, as shown in FIG. 8 and FIG. 9, an installation column 217 is convexly provided at the wall surface corresponding to the opening of the inner side of the housing 212. The lamp panel 25 can be abutted against the end of the installation column 217 away from the housing 212, and is connected to the housing 212 by screws. In other embodiments, the lamp panel 25 can be connected to the housing 212 by screws or magnets, and the like.

In an embodiment of the present application, in order to simplify the installation of the reflector 219 on the housing 212, as shown in FIG. 9, the reflector 219 can be connected to the housing 212 by a snap-fit. In other embodiments, the reflector 219 can be connected to the housing 212 by screws or magnets.

As shown in FIG. 9, in an embodiment of the present application, the insect trapping lamp 20 can further include a sealing ring 24, and the sealing ring 24 can be clamped between the housing 212 and the reflector 219 to improve the sealing effect between the reflector 219 and the housing 212.

Figure 7:
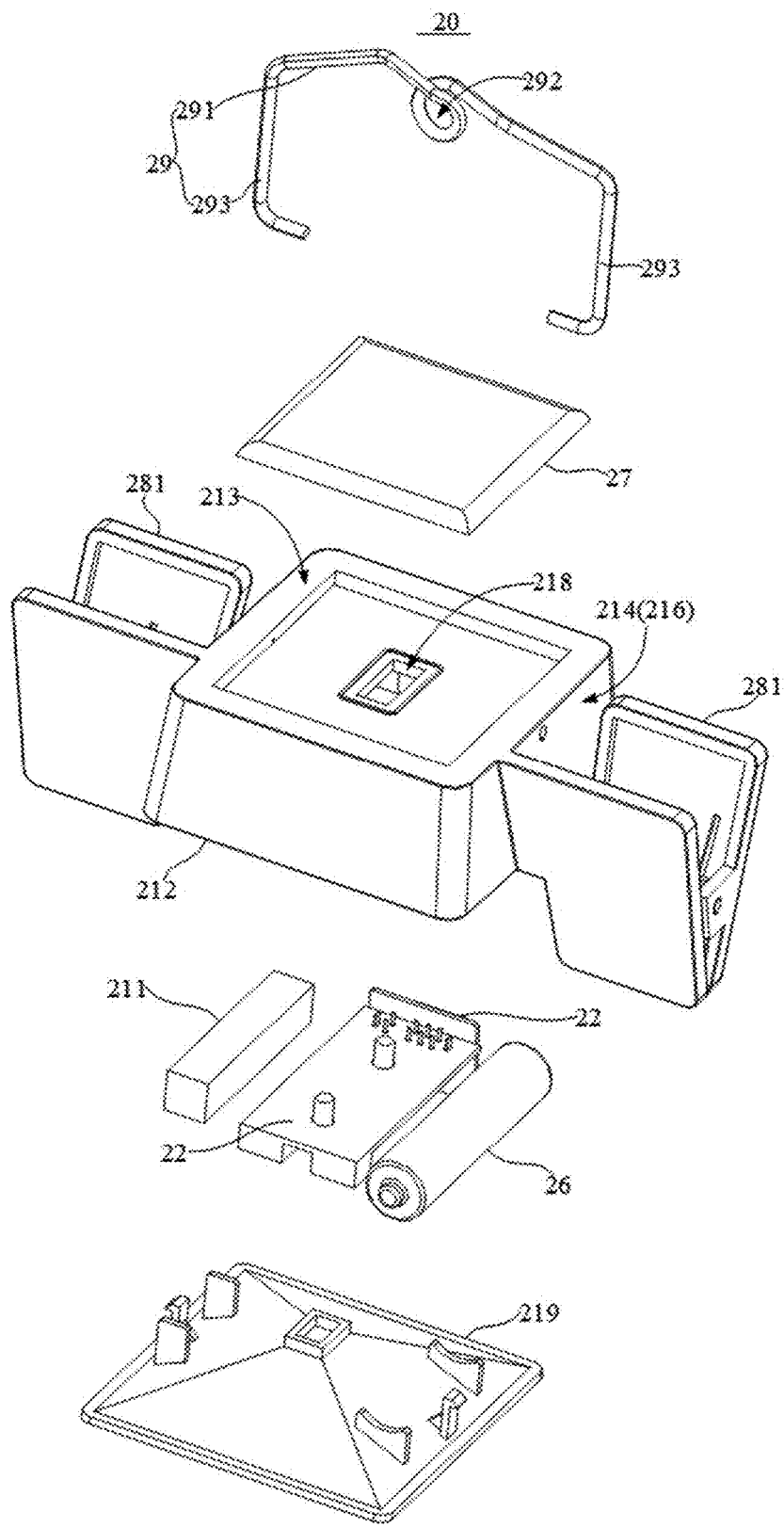
FIG. 7 is an exploded schematic structural diagram of the insect trapping lamp in FIG. 4.

As shown in FIG. 7 to FIG. 9, in an embodiment of the present application, the insect trapping lamp 20 can further include a battery 26, which is provided in the installation space 210 and is electrically connected to the light source 23, so that the light source 23 is powered by the battery 26. The battery 26 and the lamp panel 25 can be provided side by side in the installation space 210 to improve the regularity of the distribution between the battery 26 and the lamp panel 25, and improve the arrangement convenience. In this case, in order to improve the stability of the insect trapping lamp 20 installed on the support frame 10, the insect trapping lamp 20 can further include a counterweight 211, which can be provided at the side of the lamp panel 25 away from the battery 26.

As shown in FIG. 7 to FIG. 9, in an embodiment of the present application, the insect trapping lamp 20 can further include a solar panel 27. The solar panel 27 can be provided at the side of the housing 212 away from the opening, and is electrically connected to the battery 26, so that the solar panel 27 uses solar energy to charge the battery 26 to improve the environmental friendliness of the insect trapping device 100. In this case, in order to facilitate the electrical connection between the solar panel 27 and the battery 26, the side of the housing 212 away from the opening can be provided with a wire hole 218 communicating with the installation space 210, and the wire body electrically connecting the solar panel 27 and the battery 26 can pass through the wire hole 218.

As shown in FIG. 1 to FIG. 3 and FIG. 7, in an embodiment of the present application, the support frame 10 is provided with a hanging portion 131, and the insect trapping lamp 20 further includes a hanging structure 29, which is provided at the lamp body 21. A hanging matching portion 292 is formed at the hanging structure 29, and the hanging matching portion 292 is hung on the hanging portion 131.

In this embodiment, the insect trapping lamp 20 is hung at the support frame 10 and is matched the support frame 10, so that the assembly and disassembly of the two structures are relatively simple. The hanging portion 131 can be a hook, and it can also be a hanging ring. Likewise, the hanging matching portion 292 may also be a hook, or it can also be a hanging ring. That is, the hanging portion 131 matches the hanging matching portion 292, which means that a hook matches a hook, or a hook matches a hanging ring.

Figure 4:
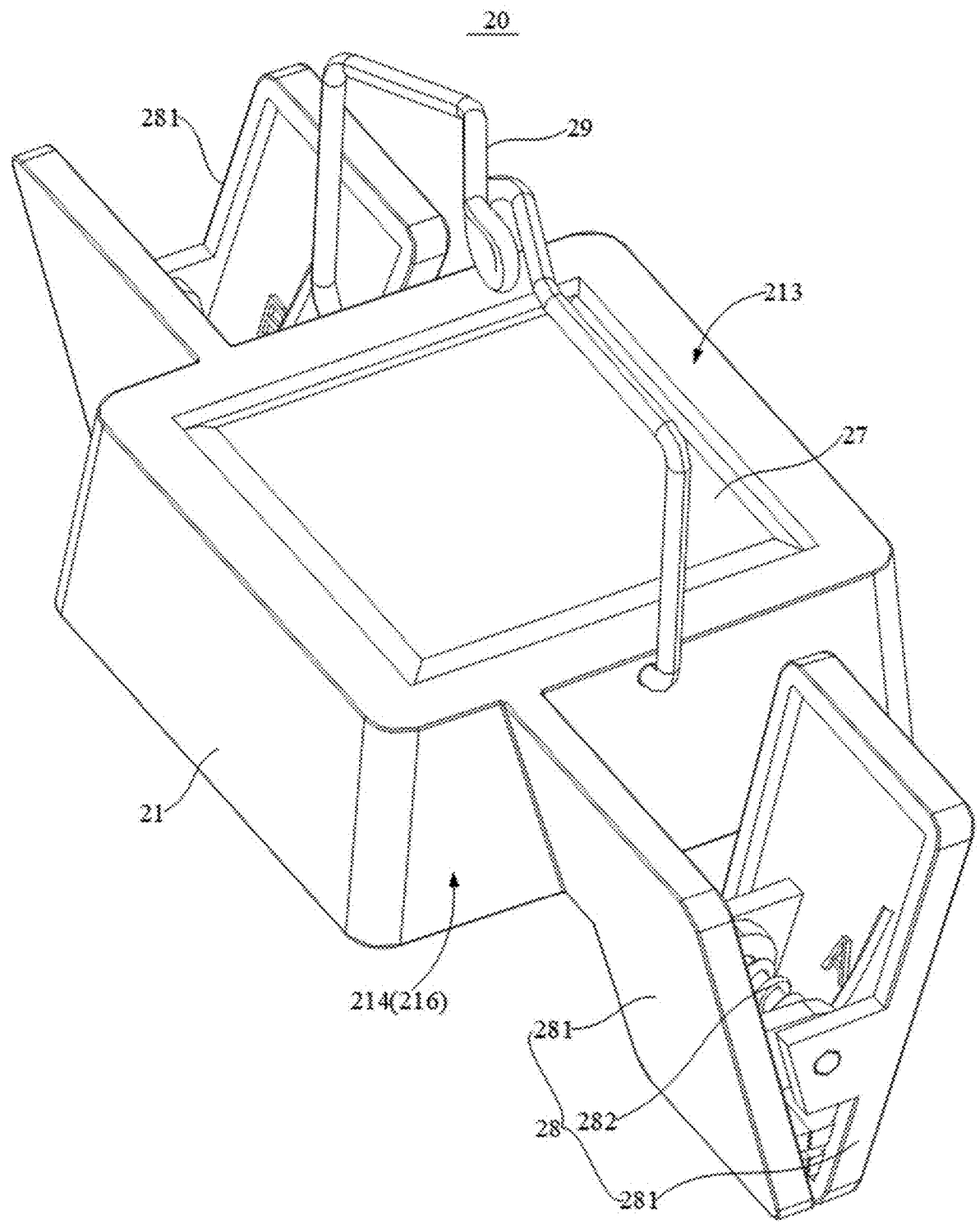
FIG. 4 is a schematic structural diagram of the insect trapping lamp in FIG. 3.
Figure 5:
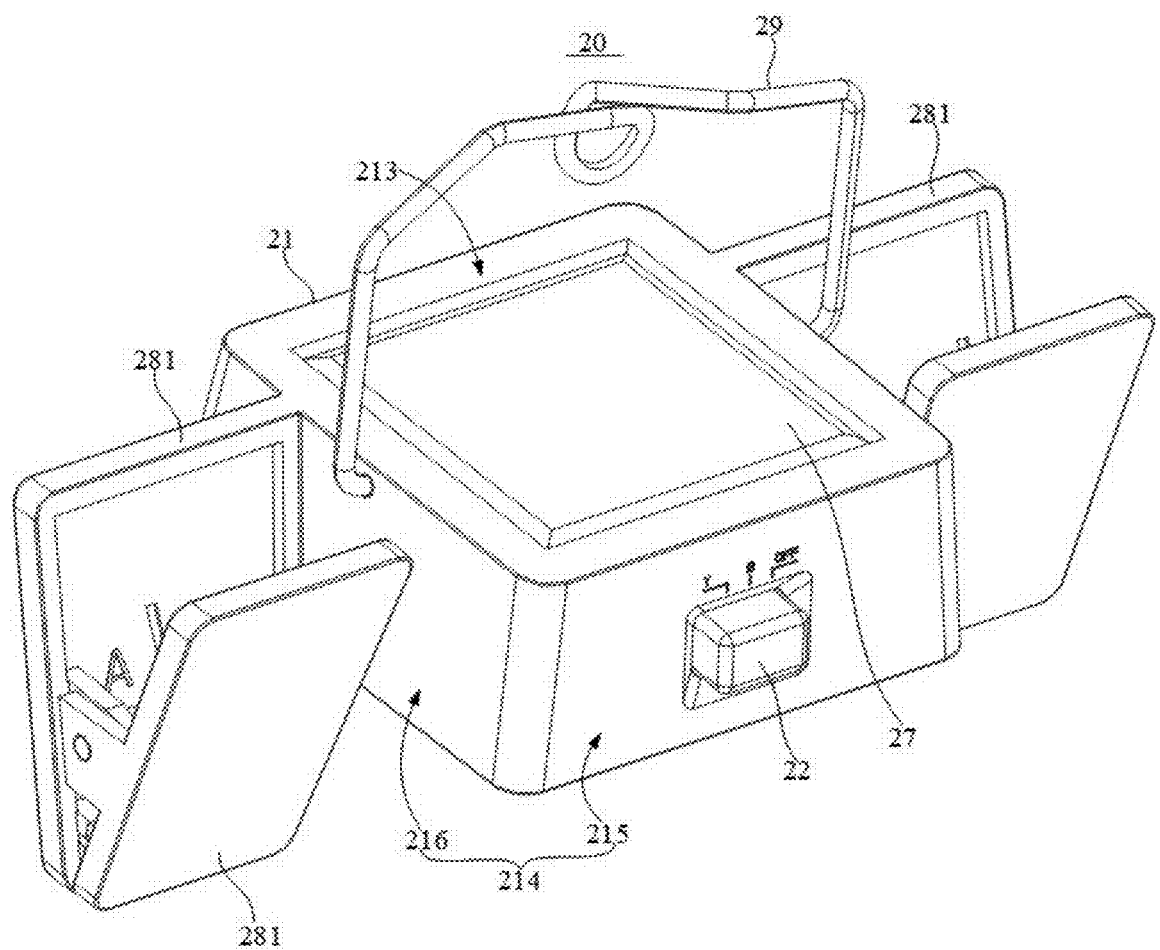
FIG. 5 is a schematic diagram of the insect trapping lamp in FIG. 4 from another perspective.
Figure 6:
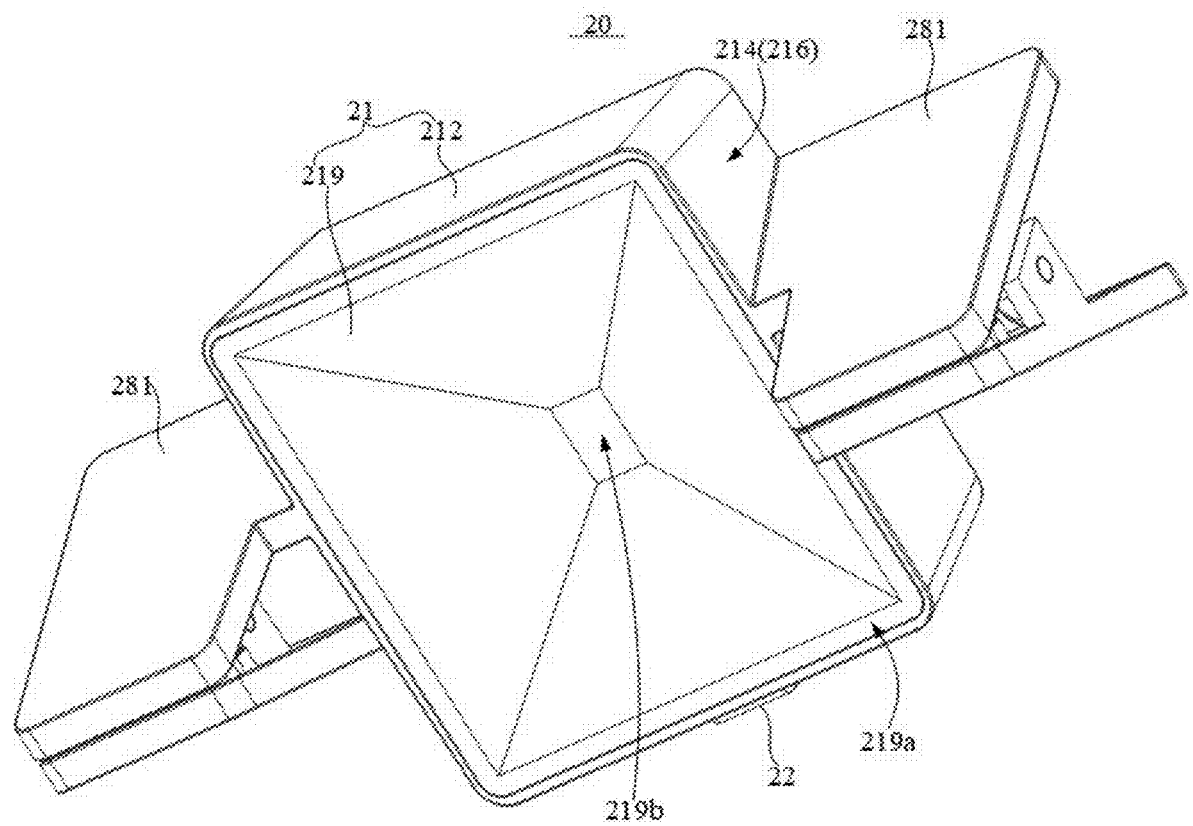
FIG. 6 is a schematic diagram of the insect trapping lamp in FIG. 4 from yet another perspective.
Figure 11:
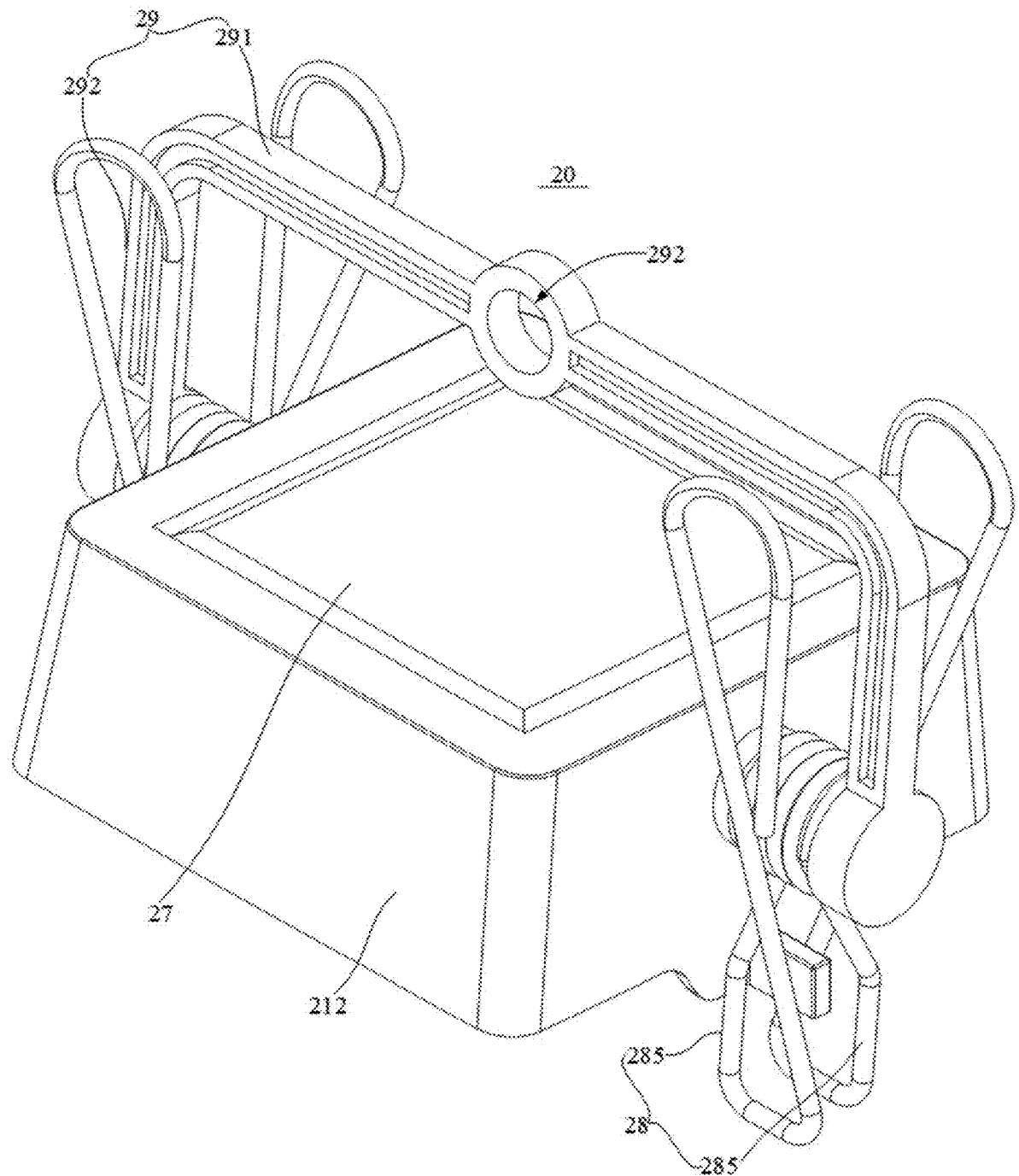
FIG. 11 is a schematic diagram of the insect trapping lamp of the insect trapping device in the present application from another perspective.

In an embodiment of the present application, in order to improve the stability of the insect trapping lamp 20 hanging on the hanging structure 29, as shown in FIG. 4 and FIG. 7, or as shown in FIG. 11, the hanging structure 29 may include a middle arm 291 and two end arms 293. The two end arms 293 are respectively connected to two ends of the middle arm 291, and connected to two opposite sides of the housing 212 of the lamp body 21. The middle arm 291 may be provided with the hanging matching portion 292 described above. In other embodiments, the hanging structure 29 may also include only two end arms 293. In this case, one end of the end arm 293 may be connected to the housing 212 of the lamp body 21, and the other end of the end arm 293 may be provided with the hanging matching portion 292.

Figure 2:
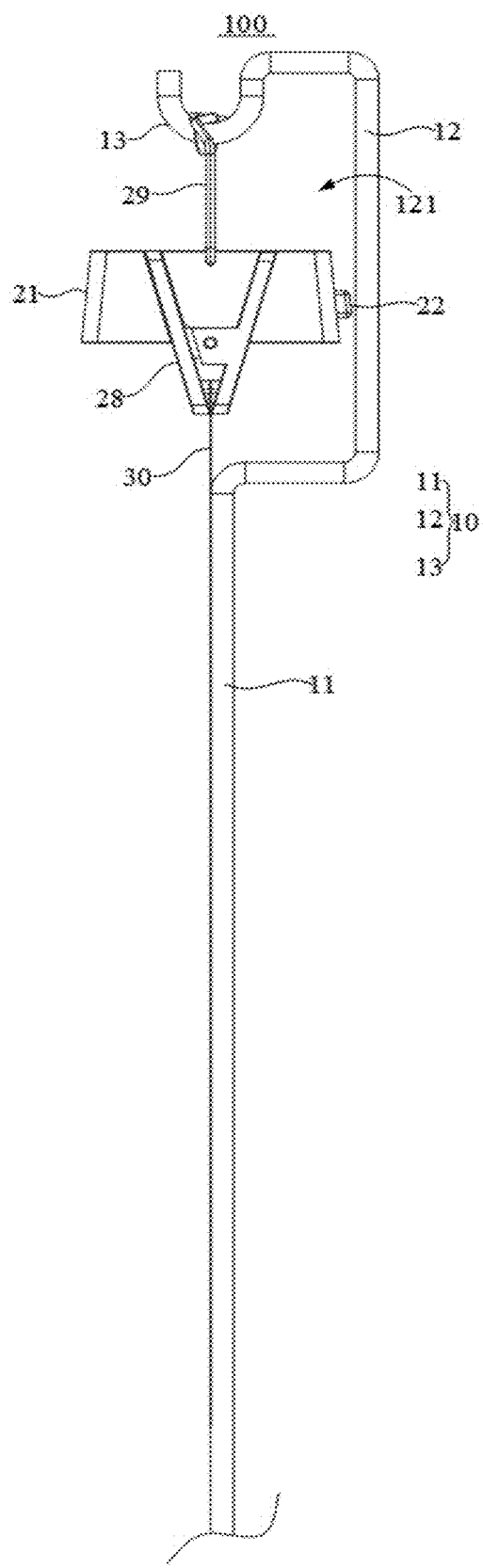
FIG. 2 is a schematic diagram of the insect trapping device in FIG. 1 from another perspective.
Figure 3:
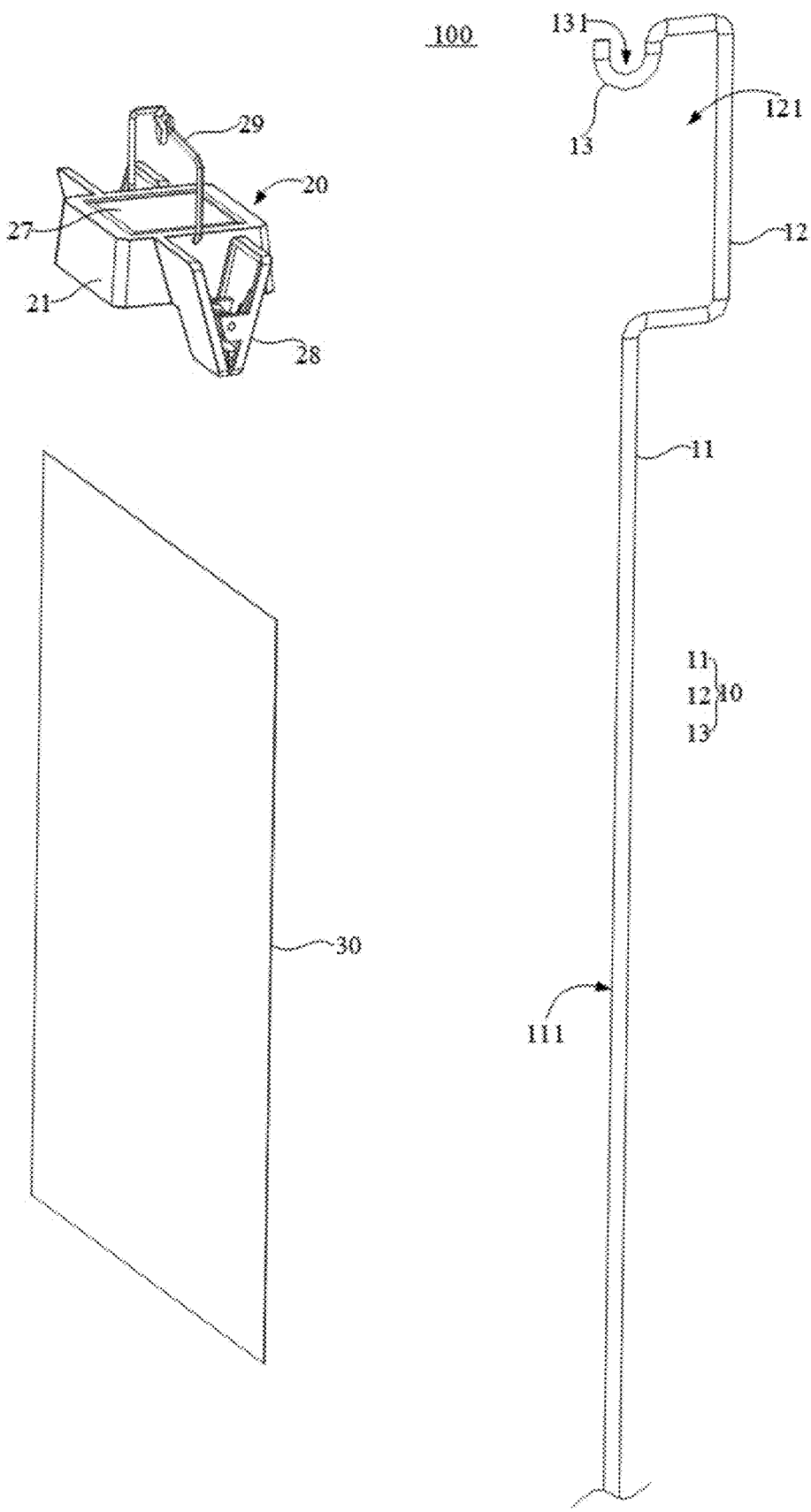
FIG. 3 is an exploded schematic structural diagram of the insect trapping device in FIG. 1.

As shown in FIG. 1 to FIG. 3, in one embodiment of the present application, the killing structure 30 may be a plate structure, so as to improve the compactness of the distribution between the insect trapping lamp 20, the killing structure 30 and the support frame 10, and provide a relatively large illumination area and a relatively large trapping area.

As shown in FIG. 1 and FIG. 2, in an embodiment of the present application, both the light emitting direction of the first light source 231 and the light emitting direction of the second light source 232 are set downward, and the killing structure 30 is vertically provided below the insect trapping lamp 20.

In this embodiment, the killing structure 30 is suspended below the insect trapping lamp 20 and is arranged vertically. On the one hand, the illumination range of the insect trapping lamp 20 on the killing structure 30 can be expanded as much as possible, which is conducive to improving the illumination effect of the killing structure 30. On the other hand, it also make the killing structure 30 be better oriented towards the surrounding area, which is conducive to improving the effect of trapping insects flying from the surrounding area. In addition, the killing structure 30 can be limited due to the gravity of the killing structure, which is conducive to improving the installation stability of the killing structure 30. Further, it should further be noted that, in other embodiments, the killing structure 30 may be arranged horizontally.

As shown in FIG. 1, FIG. 2 and FIG. 8, in an embodiment of the present application, the first light source 231 and the second light source 232 are respectively provided at opposite sides of the killing structure 30 along the normal direction (namely, the direction perpendicular to the plane where the killing structure 30 is located).

In this embodiment, the killing structure 30 is provided between the first light source 231 and the second light source 232, so that the killing structure 30 can be illuminated in a larger range whether the first light source 231 or the second light source 232 is used for illumination.

In an embodiment of the present application, in a horizontal direction intersecting the normal direction of the killing structure 30, the length of the killing structure 30 is greater than the length of the insect trapping lamp 20, so as to further increase the trapping area of the killing structure and improve the trapping effect.

Figure 10:
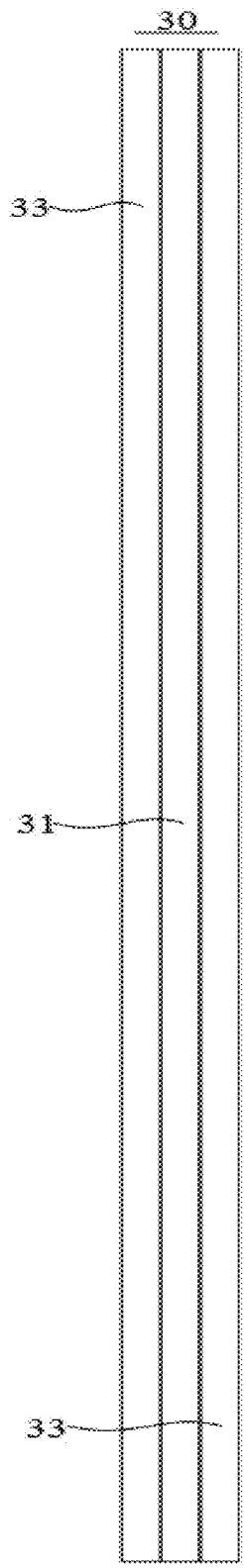
FIG. 10 is a schematic diagram of the killing structure in FIG. 3 from one perspective.

As shown in FIG. 10, in an embodiment of the present application, the killing structure 30 includes a diffusion layer 31 and an adhesive layer 33. The adhesive layer 33 is stacked on the diffusion layer 31 in the normal direction of the killing structure 30. In the normal direction of the killing structure 30, the first light source 231 and the second light source 232 are symmetrically distributed about the diffusion layer 31.

In this embodiment, the diffusion layer 31 can diffuse the light to further improve the illumination effect of the killing structure 30 and further improve the trapping effect. Moreover, the diffusion layer 31 may be further located in a middle position between the first light source 231 and the second light source 232, so that it can ensure the uniformity of illuminating the killing structure 30 with the first light source 231 or the second light source 232. The adhesive layer 33 can be used to capture insects by adhering, and it is a purely physical and mechanical structure, which is conducive to reducing costs and improving safety in use. The diffusion layer 31 can be made of polypropylene material to improve the optical effect. In addition, the adhesive layer 33 can be provided on only one surface of the diffusion layer 31. Or the adhesive layer 33 can be provided on both opposite surfaces of the diffusion layer 31 to increase the insect-adhering area and improve the insect-adhering effect. In addition, it should be noted that in other embodiments, the killing structure 30 may also include a non-woven fabric layer with the insect-trapping agent and the adhesive layer 33.

As shown in FIG. 1 to FIG. 4, in an embodiment of the present application, the insect trapping lamp 20 further includes a fixing structure 28, which is provided at the lamp body 21. The upper end of the killing structure 30 is detachably connected to the fixing structure 28.

In this embodiment, the killing structure 30 is detachably connected to the fixing structure 28 on the lamp body 21, so that the killing structure 30 can be closer to the insect trapping lamp 20, which is conducive to improving the illuminating effect of the insect trapping lamp 20 on the killing structure 30.

In an embodiment of the present application, the fixing structure 28 can clamp and fix the killing structure 30 to simplify the assembly and disassembly of the killing structure 30. In this case, as shown in FIG. 4, the fixing structure 28 can include two clamping arms 281 capable of moving close or away from each other, and an elastic member 282 is provided between the two clamping arms 281, so that the elastic member 282 drives the two clamping arms 281 to rotate close or slide close to each other, thereby clamping and fixing the upper end of the killing structure 30. In some embodiments, as shown in FIG. 11, the fixing structure 28 can also include two elastic arms 283, so that the upper end of the killing structure 30 can be clamped and fixed due to the elastic deformation of the two elastic arms 283. In addition, a fixing structure 28 is provided at at least one of two opposite sides of the lamp body 21 in a horizontal direction intersecting the normal direction of the killing structure 30, so as to clamp the killing structure 30 in a vertical arrangement.

As shown in FIG. 1 to FIG. 3, in an embodiment of the present application, the support frame 10 is provided with an abutting surface 111, and the abutting surface 111 abuts against one side of the killing structure 30 in the normal direction thereof.

In this embodiment, the support frame 10 is abutted against the killing structure 30, so that when the support frame 10 is fixed to the ground, it can also be used as a path to lure insects on the ground to the killing structure 30. In this way, the insect trapping device 100 can lure both insects in the air and insects on the ground, thereby further improving the insect-trapping effect of the insect trapping device 100. In addition, the support frame 10 can further support the killing structure 30, thereby further improving the installation stability of the killing structure 30. The support frame 10 can abut against one side of the killing structure 30 in the first direction, so that a better contact position between the support frame 10 and the killing structure 30 can be provided, and the abutment stability between the support frame 10 and the killing structure 30 can be improved.

As shown in FIG. 2 and FIG. 3, in an embodiment of the present application, the support frame 10 includes a support section 11, a bend section 12 and a connecting section 13. The support section 11 extends in the up-down direction, and the lower end of the support section 11 is lower than the lower end of the killing structure 30. An abutting surface 111 is formed at the support section 11. The bend section 12 is connected to the upper end of the support section 11, and the bend section 12 is bent to form an escape space 121. A part of the lamp body 21 is accommodated in the escape space 121. The connecting section 13 is connected to the upper end of the bend section 12, and is bent to form a hanging portion 131.

The support section 11 can be in a linear shape. The bend section 12 can be C-shaped, and the connecting section 13 can be U-shaped. In addition, the connecting section 13 can extend along a side away from the escape space 121, and is bent to form a hanging portion 131. The connecting section 13 can also extend into the escape space 121, and is bent to form a hanging portion 131.

In this embodiment, the support section 11 is conveniently inserted into the ground, thereby realizing the rapid installation of the insect trapping device 100 on the ground. Moreover, with the abutting surface 111, a path is formed to lure insects on the ground to the killing structure 30. Furthermore, the bend section 12 can be provided to conveniently avoid the insect trapping lamp 20, so as to further improve the compactness of the distribution between the insect trapping lamp 20 and the support frame 10 based on the abutment between the killing structure 30 and the support frame 10. The connecting section 13 can conveniently form the hanging portion 131, which can be detachably hung at and matched with the hanging structure 29 of the insect trapping lamp 20. In addition, the support frame 10 includes a support section 11, a bend section 12 and a connecting section 13, which further makes the overall structure of the support frame 10 simpler, and is also conducive to improving the manufacturing convenience and reducing the manufacturing cost. The support section 11, the bend section 12 and the connecting section 13 can be an integrated structure to improve the overall strength of the support frame 10 and improve the molding convenience and production efficiency through integrated molding. In addition, the cross-sections of the support section 11, the bend section 12 and the connecting section 13 can all be in the circular shape, so that they are more regular and convenient to manufacture, and also facilitate assembly and disassembly of the insect trapping lamp 20 on the support frame 10. In other embodiments, the cross-sections of the support section 11, the bend section 12 and the connecting section 13 can all be in the square shape or the rectangular shape, and the like.

As shown in FIG. 2 to FIG. 6, in an embodiment of the present application, the lamp body 21 includes a first wall surface 219a, a second wall surface 213, and a side wall surface 214 connecting the first wall surface 219a and the second wall surface 213. The first wall surface 219a is opposite to the second wall surface 213 in the up-down direction. The first wall surface 219a faces the killing structure 30. The side wall surface 214 includes a first side surface 215 and a second side surface 216 connected to the first side surface 215. The first side surface 215 is provided in the escape space 121. The fixing structure 28 is provided at the second side surface 216 and clamps the killing structure 30.

The first wall surface 219a can be the lower surface of the lamp body 21. The second wall surface 213 can be the upper surface of the lamp body 21, and the side wall surface 214 can be the side surface of the lamp body 21. Further, when the lamp body 21 includes the housing 212 and the reflector 219 as described above, the second wall surface 213 and the side wall surface 214 can be formed at the housing 212, and the first wall surface 219a can be formed at the reflector 219 or at the housing 212.

In this embodiment, the fixing structure 28 is provided at the second side surface 216, which can not only facilitate the fixing structure 28 to clamp and fix the killing structure 30, but also make the fixing structure 28 be located outside the escape space 121, thereby improving the compactness of the distribution between the lamp body 21, the fixing structure 28 and the support frame 10. In order to further improve the installation stability of the killing structure 30, two fixing structures 28 can be provided and are respectively provided at two opposite second side surfaces 216.

As shown in FIG. 4 or FIG. 11, in an embodiment of the present application, in order to facilitate the hanging cooperation between the hanging structure 29 as mentioned above and the connecting section 13 of the support frame 10 located above the lamp body 21 and to facilitate the avoidance on the solar panel 27 at the second wall surface 213, two ends of the hanging structure 29 can be connected to two opposite second side surfaces 216.

The above are only some embodiments of the present application, and do not limit the scope of the present application thereto. Under the concept of the present application, any equivalent structural transformation made according to the description and drawings of the present application, or direct/indirect application in other related technical fields, shall fall within the scope of the present application.

What is claimed is:

1. An insect trapping device, comprising:
an insect trapping lamp comprising a lamp body, a control switch, and at least two light sources, wherein the control switch and the light sources are provided at the lamp body, the at least two light sources comprise a first light source and a second light source, the first light source and the second light source are configured to emit light of different colors, and the control switch is configured to control the first light source and the second light source to be turned on; and
a killing structure detachably connected to the lamp body, wherein the killing structure is at least partially provided at an illumination area of the insect trapping lamp, to enable the killing structure to be illuminated by the insect trapping lamp and emit light, and a color of the killing structure corresponds to a color of light emitted by the first light source or the second light source.

2. The insect trapping device of claim 1, wherein light-emitting directions of the first light source and a light emitting direction of the second light source are downward, and the killing structure is a plate structure and is vertically provided below the insect trapping lamp.

3. The insect trapping device of claim 2, wherein the first light source and the second light source are respectively provided at opposite sides of a normal direction of the killing structure.

4. The insect trapping device of claim 3, wherein:
the killing structure comprises a diffusion layer and an adhesive layer, and the diffusion layer and the adhesive layer are stacked in the normal direction of the killing structure; and
in the normal direction of the killing structure, the first light source and the second light source are symmetrically distributed with respect to the diffusion layer.

5. The insect trapping device of claim 4, wherein two adhesive layers are provided, and the two adhesive layers are stacked at opposite sides of the diffusion layer in the normal direction; and/or
in a horizontal direction intersecting the normal direction of the killing structure, a length of the killing structure is greater than a length of the insect trap lamp.

6. The insect trapping device of claim 2, wherein the insect trap lamp further comprises a fixing structure, the fixing structure is provided at at least one of opposite sides of the lamp body in a horizontal direction intersecting the normal direction of the killing structure, and an upper end of the killing structure is detachably connected to the fixing structure.

7. The insect trapping device of claim 2, further comprising a support frame, wherein the lamp body is provided at the support frame, the support frame is provided with an abutting surface, and the abutting surface is configured to abut against one side of the killing structure in the normal direction.

8. The insect trapping device of claim 7, wherein the support frame comprises:
a support section extending along an up-down direction, wherein a lower end of the support section is lower than a lower end of the killing structure, and the abutting surface is formed at the support section;
a bend section connected to an upper end of the support section, wherein the bend section is bent to form an escape space, and a portion of the lamp body is accommodated in the escape space; and a connecting section connected to an upper end of the bend section, wherein an upper end of the lamp body is detachably connected to the connecting section.

9. The insect trapping device of claim 1, wherein:

the first light source is configured to emit purple light, and a color of the killing structure is purple; and/or the second light source is configured to emit yellow light, and a color of the killing structure is yellow.

10. The insect attractant of claim 9, wherein:

in response to that the first light source is configured to emit purple light, a crest of light emitted by the first light source is in a range from 395 nm to 405 nm; and/or in response to that the second light source is configured to emit yellow light, a crest of light emitted by the second light source is in a range from 585 nm to 595 nm.

* * * * *